Patented Feb. 9, 1954

2,668,810

UNITED STATES PATENT OFFICE 2,668,810

PROCESS FOR THE SAPONIFICATION OF POLYVINYL ESTERS

Eduard Bergmeister, Wolfgang Gruber, and Joseph Heckmaier, Burghausen, Upper Bavaria, Germany, assignors to Wacker-Chemie G. m. b. H., a corporation No Drawing. Application April 21, 1952, Serial No. 283,511

Claims priority, application Germany May 17, 1951

3 Claims. (Cl. 260—91.3)

This invention relates to the saponification of polyvinyl esters, and it has for its object to provide a novel and improved process for this purpose.

Another object of the invention is to provide a simple and economical process for saponifying polyvinyl esters, or mixed polymerizates containing polyvinyl esters, without producing undesirable by-products.

Still another object is to accelerate considerably the saponification of polyvinyl esters or mixed polymerizates of the above-mentioned type.

Various other objects and advantages will be apparent as the nature of the invention is more fully disclosed.

It is known that aqueous solutions of polyvinyl alcohols, which may be used directly for various purposes such as emulsification, can be obtained from aqueous emulsions of polyvinyl esters, particularly polyvinyl acetate, by saponification by means of strong mineral acids. The saponification procedure consists essentially of permitting aqueous emulsions of polyvinyl esters produced in the known manner and at temperatures between 20 and 100° C. to be acted on by a strong mineral acid such as sulfuric or hydrochloric acid, with accompanying stirring. The saponification occurs in accordance with the acid concentration and the temperature employed; at 60° C. and the use of 9% sulfuric acid the saponification requires at least 90 hours. In order to reduce the conversion period as much as possible for economic reasons in the technique, it is necessary to operate with very high acid concentrations which, however, has numerous disadvantages. For one thing, polyvinyl alcohol solutions with high electrolyte content occur, which is troublesome if they are to be used, for example, for the production of artificial polymerizates. Furthermore, because of the high acid content discolorizations of the polyvinyl alcohol solutions occur, rendering them unsuitable for further processing, for example for producing acetals.

We have now found to our surprise that the saponification of finely divided water-suspended, that is emulsified, polyvinyl esters (particularly polyvinyl acetate or mixed polymerizates containing polyvinyl acetate) can be considerably accelerated when the saponification occurs in the presence of hydrochloric acid or sulfuric acid and small quantities of perchloric acid and/or its water-soluble neutral salts. As such salts, water-soluble alkali and/or alkaline earth salts, for example sodium perchlorate or calcium perchlorate, are suitable. Acids with lower dissociation constants, or their salts, are ineffective. The shortening of the reaction time is considerable. If the operation is begun with 100 parts of an aqueous emulsion, which contain about 40% polyvinyl ester and 5.6 parts of 100% strength hydrochloric acid, the saponification takes place at 50° C., and with an addition of 1.4 parts of calcium perchlorate 7 times as fast, or with 1.4 parts of sodium perchlorate 4½ times as fast, as without the salt addition. The saponification period remains shortened in the same ratio even in the case of lower conversion temperatures. The saponification may be interrupted at any time, e. g. through neutralization or cooling, so that polyvinyl-containing groups of esters may be obtained. The removal of the organic acids which occur at saponification may be effected by mixing with it before, during or after conversion, a low-boiling point alcohol, which is reduced to ester with the acid and distilled off.

Our process is not confined to the saponification of polyvinyl ester emulsions, since it is also possible to use polyvinyl esters, e. g. polyvinyl acetate, which occur in pearl form in the polymerization, or which is finely ground or in granular form. Furthermore, the process is also applicable in complete or partial hydrolysis of mixed polymerizates or vinyl ester, if necessary also with other polymerizable compounds.

*Example I*

Into 480 g. of an aqueous emulsion, which contains 240 g. of polyvinyl-acetate, a solution of 60 g. concentrated hydrochloric acid (D=1.18) and 10 g. sodium perchlorate, dissolved in 200 g. of water, is stirred and saponified during 3 hours at 70° C. A clear 20.5% solution of a polyvinyl alcohol is obtained, which still contains 11% acetate groups. If the addition of the sodium perchlorate is omitted with the above procedure and with other conditions being the same, an aqueous solution of polyvinyl alcohol is obtained after 12 hours, which still contains 16% acetate groups.

*Example 2*

A quantity of 240 g. of a mixed polymerizate in pearl form, which is produced from 97% vinyl acetate and 3% crotonic acid, is suspended in a solution of 60 g. concentrated hydrochloric acid and 10 g. sodium perchlorate in 440 ccm. of water, whereupon the suspension is stirred for 4 hours at 70° C. A 17.7% solution is obtained of a mixed polymerizates, which contains 90% vinyl alcohol, 8% polyvinyl acetate and 2% crotonic acid groups. If the same reaction is performed without the addition of sodium perchlorate, after 4 hours of reaction time at 70° C. only 20% of the acetate groups is substituted by the hydroxyl groups.

Although certain specific embodiments are set forth herein for purposes of illustration, it will be evident to those skilled in the art that the invention is capable of various modifications and adaptations within the scope of the appended claims.

The invention claimed is:

1. The process for saponifying polyvinyl esters finely divided in water which comprises heating same in the presence of a member selected from the group consisting of hydrochloric and sulfuric acids and 0.1–5% of a member selected from the group consisting of perchloric acid and a water-soluble neutral salt thereof.

2. The process according to claim 1, in which the water-soluble neutral salt is selected from the group consisting of the alkali and alkaline earth salts of perchloric acid.

3. The process for saponifying polyvinyl acetate finely divided in water which comprises subjecting same to saponification conditions in the presence of a member selected from the group consisting of hydrochloric and sulfuric acids and 0.1–5% of a member selected from the group consisting of perchloric acid and a water-soluble neutral salt thereof.

EDUARD BERGMEISTER.
WOLFGANG GRUBER.
JOSEPH HECKMAIER.

References Cited in the file of this patent

UNITED STATES PATENTS

| Number | Name | Date |
|---|---|---|
| 2,547,618 | Bisch et al. | Apr. 3, 1951 |

FOREIGN PATENTS

| Number | Country | Date |
|---|---|---|
| 528,741 | Germany | July 15, 1931 |